United States Patent Office 3,327,309
Patented June 20, 1967

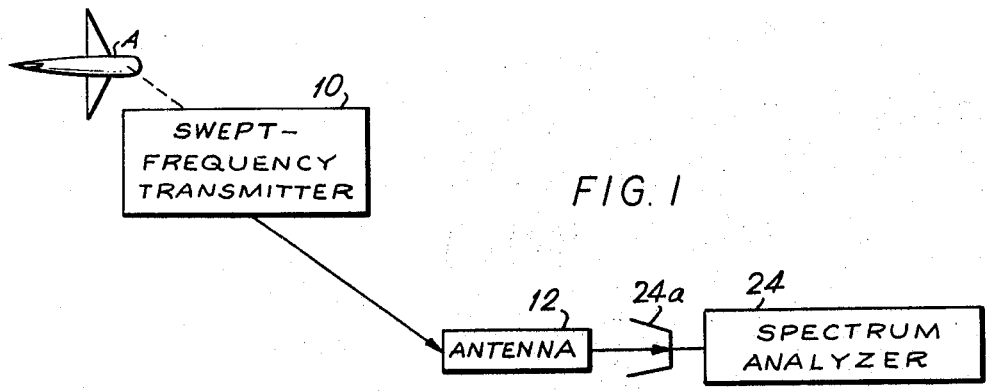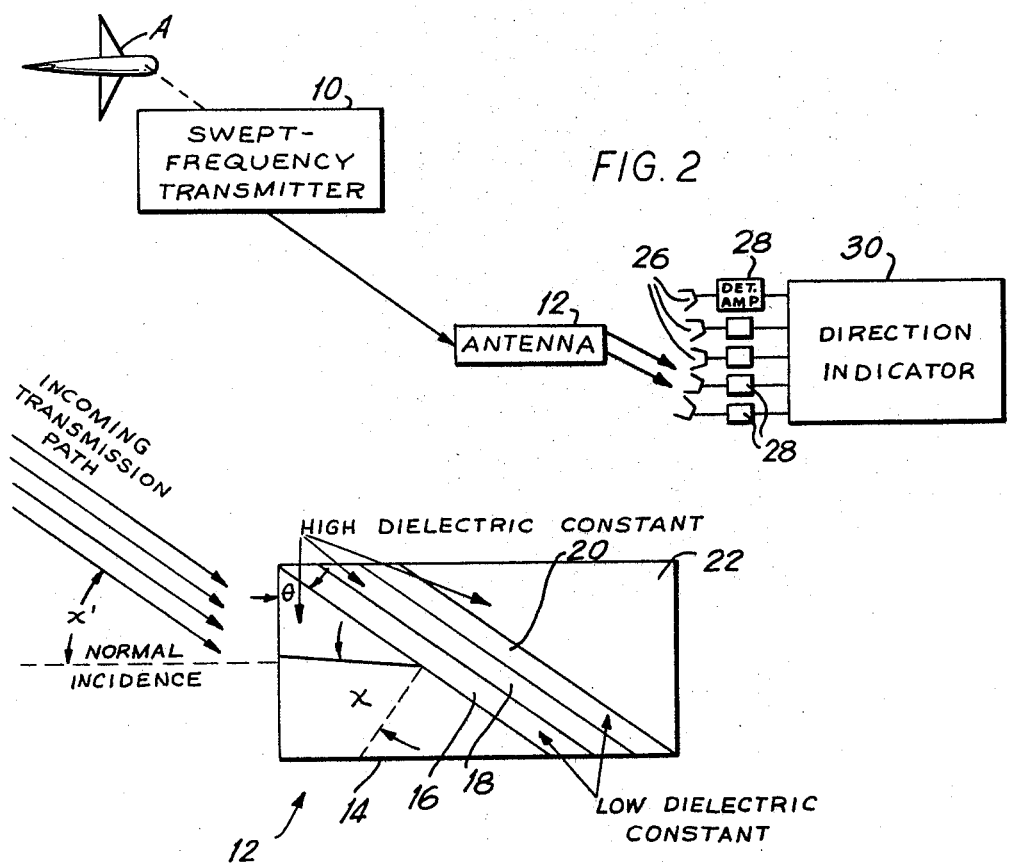

3,327,309
RADIO TRANSMISSION SYSTEMS AND ANTENNAS THEREFOR
Carl Shulman, Edgewater, N.J., and Albert Lederman, New York, and Stephen H. Maybar, Brooklyn, N.Y., assignors to MSI Electronics Inc., Woodside, N.Y., a corporation of Delaware
Filed Oct. 21, 1965, Ser. No. 499,682
10 Claims. (Cl. 343—100)

ABSTRACT OF THE DISCLOSURE

A transmitted signal passing through a multilayer frustrated total reflection resonance filter gives a unique measure of the direction of the incident electromagnetic transmission. An antenna utilizing this property is incorporated into a system for air navigation and direction finding. A measurement of frequency of the transmission determines the direction from a source without the use of moving parts.

The present invention relates to selective directional radio-signal transmission systems and to a specialized form of antenna for such systems.

The invention is described below as an aid in air-navigation, for indicating the direction of a radio-signal source relative to a receiver location, but this illustrative description is not intended as limiting since other systems utilizing the special characteristics of the novel apparatus will be readily apparent to those skilled in the art.

In radio direction finding systems, it has been a common practice to operate a mechanical scanning antenna as part of direction-finding equipment for aircraft approaching an airport. Mechanical scanning is objectionable in many respects, involving expense, slowness and potential operating troubles especially in adverse environments.

An object of the present invention resides in the provision of a novel transmission system for radio signals suitable for direction finding and more generally applicable, that is not dependent upon mechanical scanning for responding selectively to a range of signals from different directions. A related object resides in the provision of such a system that is capable of responding concurrently and separately to radio signals of different frequencies in corresponding directions relative to the receiving apparatus that includes an antenna and signal receiving means. The novel antenna included in the illustrative transmission systems described below has unique properties contributing to the feasibility of those systems and represents an important aspect of the invention.

Apparatus illustrating the novel features of the invention is shown in the accompanying drawings, and is best understood by referring to the detailed description below. This apparatus includes a transmitter and receiving apparatus including a direction- and frequency-selective antenna and a receiver for the signals selectively passed by the antenna. The receiver is differently responsive to signals from the antenna where such signals are (a) of different frequencies; and (b) in different directions. The antenna includes at least five dielectric elements of different dielectric constants including three such elements bounded by successive parallel interfaces. The antenna operates selectively to transmit incident signals of different frequencies only along directions that correspond to such frequencies by virtue of a "frustrated total internal reflection" effect that characterizes the antenna. (This effect is more fully discussed below). Depending upon its design, the system is capable of resolving the direction of the transmitter to a high degree of accuracy, and needs no mechanical scanning means.

In the description that follows, it is tacitly assumed that the transmitter is on a mobile carrier such as an aircraft and that the receiving apparatus is at a fixed location. The reverse is an alternative of evident practical merit, in this case utilizing a stationary transmitter beacon and mobile receiving apparatus. Further, while the transmitter in the specific embodiments described below is represented as a primary signal source, it may take the form of a secondary signal source such as an active repeater or, conceivably, a passive reflector; and in that case, the primary signal source would ordinarily be a transmitter located adjacent the receiving apparatus.

The nature of the invention including the foregoing objects, advantages and novel features, and others, will be better appreciated from the specific description that follows and from the accompanying drawings mentioned in the description. In the drawings:

FIGURES 1 and 2 are diagrams representing two radio signal transmission systems embodying common features of the invention and each embodiment having particular advantages; and FIGURE 3 is a diagram representing a novel antenna for radio signals, this antenna being a component in each of the transmission systems of FIGS. 1 and 2.

In FIGS. 1 and 2, aircraft A constitutes a mobile carrier of a transmitter or signal source 10 whose output frequency is swept so as to vary in rapidly repeated cycles over the range of operating frequencies of the receiving apparatus.

The receiving apparatus in FIGS. 1 and 2 includes an antenna 12 which is shown in detail in FIG. 3. This antenna includes a sequence of elements 14, 16, 18, 20 and 22, five elements being shown but larger numbers being contemplated. These elements adjoin one another in flat parallel interfaces. The end elements 14 and 22 of the sequence have flat end faces and are of triangular cross-section, as shown. Each of the parallel-faced elements 16, 18 and 20 is of relatively small thickness between the interfaces of the sequence, compared to the large dimensions of the interfaces both along the lines in the drawing representing the interfaces and perpendicular to the plane of the drawing.

The sequence of elements 14 . . . 22 are of insulating materials having different dielectric constants. The dielectric constants alternate, so that the end elements 14 and 22, and the intermediate element 18, have higher dielectric constants than the dielectric constants of elements 16 and 20. For simplified design purposes and widest-angle performance it is best to make elements 14, 18 and 22 of the one material and to make elements 16 and 20 of another material so that theer are only two dielectric constants to be considered. In any case, the dielectric constant of the triangular end elements should be relatively high, compared to air, and there should be at least three elements bounded by parallel interfaces. Where the dielectric constants alternate so as to be low, higher, low (etc.), there should be an odd number of elements in the sequence. The end elements shown in the drawing do not preclude supplemental devices such as quarterwave-thick dielectric members that might be used to minimize surface reflections. Auxiliary baffles to exclude transmissions outside the arc for which the antenna is selective are also contemplated.

This antenna has an important property that avoids the need for mechanical scanning motion in achieving selective response to signals from different directions. For each angle of incidence $\chi$ of the incoming wave at the first interface, greater than the critical angle for which total reflection should occur in element 14 (were that an isolated element apart from the other elements) the antenna passes a different frequency. This property is utilized in the air navigation systems of FIGS. 1 and 2.

In FIG. 1, all of the output of antenna 12 is supplied to a spectrum analyzer 24. This instrument includes an electronic sweep-tuned receiver whose output causes vertical deflection of a cathode-ray tube, while the beam of the cathode-ray tube deflects horizontally in synchronism with the sweep-tuning.

The transmitter aboard the aircraft has an output frequency which, by design, changes in some manner different from the sweep-tuning of the spectrum analyzer. In an extreme example, the transmitter may produce "noise" including signal components at all frequencies of the antenna selective-response band. The antenna will pass particular frequencies, arriving along corresponding paths. The spectrum analyzer in detecting particular frequencies thus acts to find the direction of the signal sources. The frequencies detected by the spectrum analyzer come via the selective antenna from the directions corresponding to those frequencies.

In the system of FIG. 2, the apparatus for analyzing the output of the antenna includes an array of directional signal pick-up elements such as microwave horns 26 coupled to respective signal detectors and amplifiers 28 and a common direction indicator 30. The latter may include a circuit network for improving the signal recognition; for even with a relatively large number of detectors, it is at times desirable to interpolate. Thus, a signal from the antenna directed at some part of an overlap involving two horns 26 can be interpreted as signifying some direction between the two horns. It may be closer to the direction of one horn than the other, and this would be resolved in providing a frequency-direction indication.

The antenna in the systems of FIGS. 1 and 2 is a unit that is physical stationary, and yet it operates in a sense as if it were scanning over a range of angles of incoming transmission paths. For a signal along any given path (within its operative angular range) the antenna will pass only one frequency. Signals of different frequencies will be transmitted by the antenna, provided the transmission path at the input end of the antenna has the proper angle related to such different frequency.

For any signal in its operative range, the antenna has a transmission characteristic:

$$|T(\rho\epsilon)|^2 = \frac{1}{1+4Q(k\rho+\epsilon)^2} \quad (1)$$

Where T is the ratio of the exit energy to the entrance energy of the antenna;

$\rho$ is a measure of the change in the angle of incidence at the first interface from an angle of a signal path having 100% transmission, called the resonant frequency;

$\epsilon$ is the fractional change in the frequency from resonant frequency;

$k$ is a constant related to the dielectric constants $K_1$ and $K_2$ of the material of elements 14 . . . 22; and Q is the figure of merit for the antenna that depends on a ratio of $K_1$ and $K_2$. Q is $f/\Delta f$ where $f$ is any frequency in the operative range, and $\Delta f$ is the frequency departure at which half-energy is transmitted.

Total transmission (apart from losses) occurs when $(k\rho+\epsilon)$ equals zero in the above expression for T, that is, where $k\rho$ equals $-\epsilon$. This occurs where, for a critical angle of incidence $\chi$ related to the frequency of that signal, resonance should occur in the next parallel-faced dielectric element of the antenna. This resonance phenomenon occurs in an assembly where the thickness $d$ of any one parallel-faced dielectric element is a small order of magnitude compared to the lateral dimensions of the interface, and where the angle of incidence at the high dielectric side of the interface is such that total internal reflection would occur in the element. The assembly which involves this resonance effect "frustrates" such total internal reflection.

In designing an antenna, the center operating wavelength $\lambda_0$ is first chosen, and a practical value of L is chosen, where L is the length in centimeters of the interface between the first two dielectric elements. This establishes Q since $L \cong Q\lambda_0$.

$$\lambda_0 = \frac{4d_2}{m}\sqrt{\frac{1-a^2}{2}} \quad (2)$$

and $$\sin \chi_0 = \sqrt{\frac{1+a^2}{2}} \quad (3)$$

where $m$ is a number 1, 3, 5 . . . ;

$d_2$ is the thickness of the element 18 between two elements 16 and 20 having a lower dielectric constant, and whose thickness is $d_1$.

$a^2$ is equal to the dielectric-constant ratio $K_1/K_2$. $K_1$ is the lower of two dielectric constants and $K_2$ is the higher, in two adjoining elements.

$$Q = \frac{m\pi\epsilon^{2\alpha}}{8} \quad (4)$$

and $$\gamma = \frac{m\pi}{2} \cdot \frac{d_1}{d_2} \quad (5)$$

From the expression (4), $d_2$ is calculated for $\lambda_0$, using selected dielectric materials.

It is seen from Equation 5 that $\gamma$ is evaluated in terms of $d_1$ and $d_2$. Having $d_2$ and a selected value of Q, $d_1$ may be evaluated from Equations 4 and 5.

Choosing materials giving $K_2/K_1=2:1$, a frequency-selective antenna for the band 8.2 to 12.4 gHz., capable of 200 mcs. separation, would be approximately 75 cm. square and 260 cm. long. The material of elements 14, 18 and 22 can be a polyester resin glass laminate whose dielectric constant is 4.16. Angle $\theta$ of element 14 between the flat exposed surface and the interface between elements 14 and 16 is 59°, in an example. Elements 16 and 20 would be 2.3 cm. thick, fabricated of low-loss Teflon having a dielectric constant of 2.08, in this example. Element 18 is 1.5 cm. thick in this example.

The dielectrics used should be low-loss materials. They need not be homogeneous, as in the case of the polyester resin-glass laminate mentioned above and in the case of foamed plastics. Also, various geometric configurations of dielectric rods, balls and the like are known to behave effectively as dielectrics where their spacing is such as to simulate other dielectric materials for the wave-lengths involved. Also, elements 16 and 20 may even be an air-space defined by elements 14, 18 and 20, suitably mechanically secured in the positions shown.

The source is presumed to be at a great distance from the antenna, so the radio signal impinging on the antenna is a plane polarized wave. The equations appearing above are for the case where the plane of polarization is perpendicular to the plane of incidence. Corresponding equations may be derived for parallel polarization, i.e., waves polarized in the plane of incidence. The plane of polarization is defined by the direction of propagation and the normals to all the surfaces of the described antenna, and all azimuths of the transmissions whose directions are to be resolved are in this common plane.

What is claimed is:

1. As a radio signal transmission component in the path between a radio transmitter and a radio receiver, an antenna having respective ends for the signal paths to the transmitter and the receiver for selective transmission of signals of different freqeuncies along correspondingly differently directed paths at one end of the antenna, said antenna comprising a sequence of at least five dielectric elements confronting one another at successive bounding parallel interfaces, said sequence including end elements, an intermediate element and two other elements between which said intermediate element is disposed, each of the elements of the sequence which is bounded by parallel interfaces having much larger transverse dimensions than the thickness thereof, each of the elements of the sequence having a different dielectric constant than that of its neighbor or neighbors in the sequence, the dielectric constant of the end elements and said intermediate element being higher than that of said two other elements, and each said end element having an end surface disposed at an acute angle to the bounding surface thereof which forms one of said parallel interfaces.

2. An antenna in accordance with claim 1, wherein means is included for supporting at least two of said elements in positions with a parallel-faced space between them and where said space constitutes one of said sequence of elements.

3. An antenna in accordance with claim 1, wherein there is an odd number of elements in the sequence, wherein the odd-numbered elements are all of one dielectric constant, and wherein the even-numbered elements are all of another dielectric constant lower than said one dielectric constant.

4. Apparatus for determining the direction of a radio signal source operable at a particular frequency within a range of frequencies, including in combination means for receiving and separately identifying signals of different frequencies in said range of frequencies and an antenna in accordance with claim 1, suitably proportioned for selective transimssion of said frequencies, said antenna being disposed for directing the signal emission from the antenna toward said receiving means.

5. Apparatus in accordance with claim 4, wherein said receiving means includes a spectrum analyzer.

6. Apparatus in accordance with claim 4 wherein said receiving means includes an angularly related series of directional signal pick-up elements.

7. A radio signal transmission system including an antenna in accordance with claim 1 and a transmitter and a receiver for radio signals in the transmission path to the respective ends of said antenna, and a mobile carrier for moving said transmitter to various positions over a range of different directions relative to said antenna, said transmitter being operable over a range of frequencies corresponding to the selective frequency range of said antenna.

8. A radio signal transmission system in accordance with claim 7 wherein said receiver includes a spectrum analyzer.

9. A radio signal transmission system in accordance with claim 7 wherein said receiver includes a plurality of directional signal pick-up elements distributed over a range of different angles relative to said antenna.

10. A radio signal transmission system including an antenna having opposite ends for the transmission path and having at least five dielectric elements in sequence for providing related selective frequency and directional characteristics by frustrated total internal reflection, a radio-signal transmitter directed toward one end of said antenna, and a radio-signal receiver directed toward the opposite end of the antenna, said transmitter and said receiver being operable to produce and respond to signals of like frequencies, respectively, said receiver having means for distinctively indictaing the related frequency and direction of any radio signal in its selective range and thereby indicating the direction and frequency of the transmitter relative to the antenna.

No references cited.

RODNEY D. BENNETT, *Primary Examiner.*

CHESTER L. JUSTUS, *Examiner.*

B. L. RIBANDO, *Assistant Examiner.*